No. 732,222. Patented June 30, 1903.

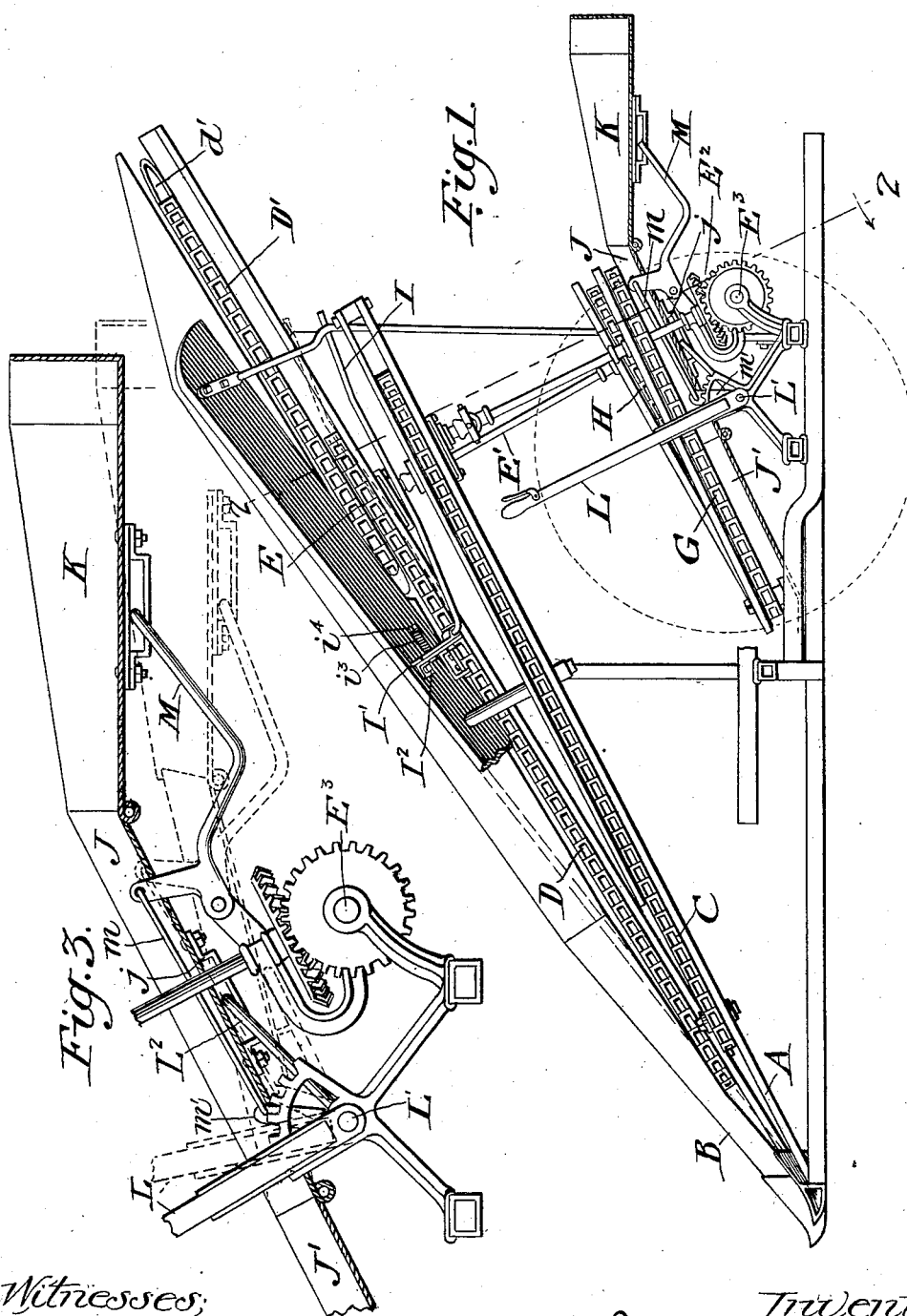

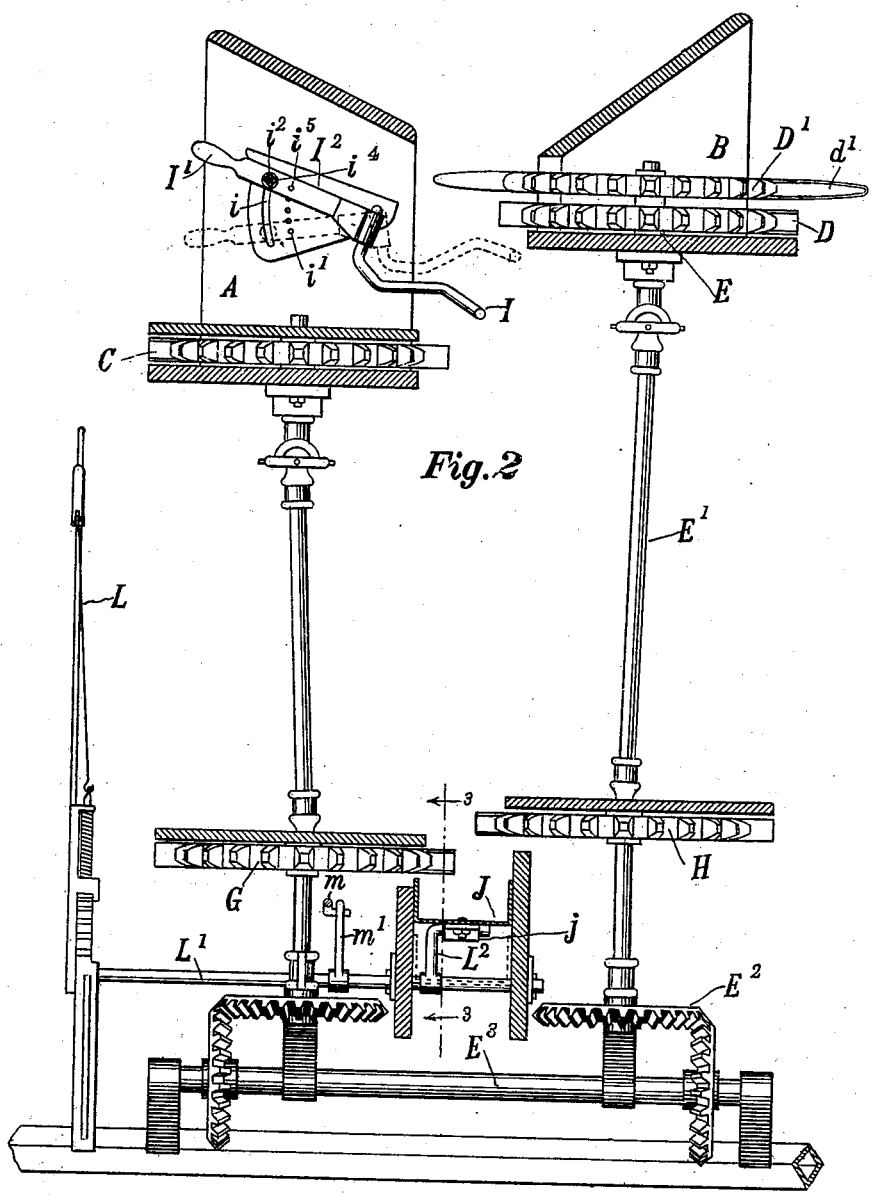

UNITED STATES PATENT OFFICE.

JOHN W. PRIDMORE AND BERT R. BENJAMIN, OF CHICAGO, ILLINOIS, ASSIGNORS TO THE McCORMICK HARVESTING MACHINE COMPANY.

CORN-HARVESTING MACHINE.

SPECIFICATION forming part of Letters Patent No. 732,222, dated June 30, 1903.

Application filed February 28, 1898. Serial No. 671,905. (No model.)

*To all whom it may concern:*

Be it known that we, JOHN W. PRIDMORE and BERT R. BENJAMIN, citizens of the United States, residing at Chicago, in the county of Cook and State of Illinois, have invented certain new and useful Improvements in Machines for Harvesting Corn, of which the following is a specification.

Our invention relates to improvements in corn-harvesting machines in which prongs, one on each side of the row, on which stalk raising and forwarding devices are positioned, extend forwardly from the main or body part of the machine to raise the fallen stalks and move them, as well as the standing stalks, back to a binder, where they are to be bound and discharged from the machine; and the objects of our improvement are, first, to so construct these prongs that they will pass beneath the lodged stalks as the machine is drawn through the field and the forwarding devices, which are positioned on each of the prongs, shall get hold of the lodged and tangled stalks and move them backward into the machine; second, to separate the forwarding device on one prong from that on the other as the stalks are moved onward between the prongs, so that they will not be pinched between these forwarding devices and thus lifted between the prongs as the machine advances; third, to position the forwarding devices at the butts of the corn so that the butts shall not be pinched as they are delivered to the receiving-table; fourth, to provide a stalk passage-way and receiving-platform for the butts of the corn that can be raised and lowered, and, fifth, to provide an adjustable guiding-rod in the stalk passage-way for the purpose of holding the stalks from being raised by the upwardly-trending prongs and forwarding devices thereon. We attain these objects by the mechanism illustrated in the accompanying drawings, in which—

Figure 1 is a side view of so much of a corn-harvesting machine as is necessary to show our improvements, the inner prong being broken away at its lower end, so as not to hide the chain on the outer prong. Fig. 2 is a rear view, partly in section, on line 2 2 of Fig. 1; and Fig. 3 is an enlarged detail view from the same side of the machine as Fig. 1, the floor of the stalk passage-way and receiving-platform being shown in section, and in dotted lines they are shown in another position.

Similar letters refer to similar parts throughout the several views.

The corn-harvesting machine to which our improvements are shown attached is of the type now known as the "Peck," shown in Reissue Patent No. 11,492, dated May 7, 1895.

The position of the main drive-wheel of the machine is shown in dotted lines in Fig. 1. The frame that surrounds this wheel and to which the wheel is attached is not shown in the drawings, as our invention has nothing to do with these parts.

A represents the projecting prong on the side of the row next the main wheel, and B the one on the other side of the row. These prongs project forwardly and come to a point in substantially the same horizontal plane a sufficient distance ahead of the machine so that the incline up which the stalks must be carried if they happen to be lodged and rest over the prong shall be an easy one. On the inside prong the inner forwarding-chain C is positioned. It begins close to the point of the prong in front and extends rearwardly to within a short distance of the upper end of the prong. The binding attachment to which the prongs deliver the stalks is not shown in the drawings; but it is of the same type as that shown in the Peck patent, heretofore referred to, and placed on the machine in practically the same position. On the outside prong B are positioned the outer forwarding-chain D and its extension D'. The chain D extends into the point of the prong B the same as the chain C does into the point of the prong A. They are at their points in about the same horizontal plane. As these chains extend rearward, however, the chain D is carried back on a greater incline than the chain C, so that at their delivery ends the chain D is above that of the chain C. The extension D' is continued onward to the rear far enough to straighten any of the stalks that may be brought up and to prevent the tops from inclining forward. The teeth d' on the chain D' are longer than on the chains C and D, inasmuch as this chain is the only forwarding device in the passage-way at the rear end of the prongs and must do the entire work of forwarding the tops of the stalks. Attention is called to the fact that the chains D and D' are driven from the same sprocket-wheel E, which has a double set of sprockets for the purpose. This sprocket-wheel E is driven by the incline shaft E' and receives its power through the bevel-wheels $E^2$ from the main driven cross-shaft $E^3$ of the machine.

Below the upper forwarding devices on the prongs and starting just back of the knife F, where the stalks are severed, are the chains G and H. The chain G is on the side of the machine next the main wheel and in the same vertical plane as the chain C, and H on the opposite side of the passage-way is in the same vertical plane as the chain D. These chains receive the butts of the stalks as they are severed, grasping them on either side, and carry them rearward along the inclined passage-way toward the table upon which they are to stand while being bound. These chains also extend rearward at different inclinations, so that their delivery ends are in different planes, as are the chains above.

Our object in changing the pitch of the chains from their receiving ends is that when the prongs pass beneath the stalks they must do so close to the ground, and any lodged stalks should be grasped at once by the chains. As the machine advances upon the stalks the prongs, owing to their upward inclination, rise on the stalks, so that at the time the corn is severed the ears ordinarily have been reached, and they fill the passage-way between the prongs, so that if the chains were kept together they would grasp the ears and stalks and tend as they carried them rearward to hold them fast, and if the inclination of the upper boards of the prongs be greater than that of the stalk passage-way at the butts the stalks would tend to be lifted from the bottom and raised from between the lower forwarding devices. Experience has shown that it is necessary to get a forwarding device for the tops of the corn high enough at its delivery end to be above the ears; but as the stalks, however, travel onward between the prongs experience has also shown that while it is necessary to have chains on both prongs when they receive the stalks, yet when they deliver the stalks one chain will do the work. By our invention, keeping the chain on one side in a lower plane and on the other side in a higher plane, we have been enabled to handle both short and tall corn, and keeping the chains in different planes the ears pass between the prongs and the teeth upon the chains without being torn from the stalks and without lifting the stalks from between the lower forwarding devices. As regards the lower forwarding devices their receiving ends sweep the knives that do the cutting and are in the same horizontal plane, so as to quickly clear the stalks from the knives and start them backward. However, as these stalks get toward the rear the forwarding devices are positioned in different planes and the butts are not pinched and torn as they are delivered upon the platform, as they would be were the delivery ends of the forwarding devices in the same plane.

In order to assist in preventing the corn from rising between the prongs, we have pivoted a rod I on the inner prong at a point practically above the position of the knife on the frame, so that this rod begins to press upon the stalks shortly after they are severed. This rod is attached to a handle I', which is pivoted to the machine on the plate $I^2$, that is bolted to the prong A. The plate $I^2$ has a slot $i$ and holes $i'$. A bolt $i^2$ passes through the slot and through the handle I', and a coiled spring $i^3$ is placed on the bolt and held thereon by an adjustable key or nut $i^4$. In the handle I' a small pin $i^5$ is placed in line with the holes $i'$. The spring holds the handle I' against the plate $I^2$ and keeps the small pin $i^5$ in the holes $i'$, and thus forms a locking device for the rod I. The rod is bent nearly at a right angle as it is attached to the handle I', and therefore when the handle is moved the rod swings in and out of the passage-way. Attention is called to the fact that the rod is bent down from the plane of the prongs, so as to be more nearly in a horizontal plane. The reason of this is to keep the stalks from rising with the prongs as the machine is drawn forward and the stalks advanced to the rear. The adjustability of the rod is for the purpose of opening or closing the passage-way, according as the corn has more or less ears, or for any reason that may appear in the varying conditions of corn.

The next important feature of our invention is the arranging of the floor of the stalk passage-way for the butts and the receiving-platform so that they can be raised and lowered, that the corn may be received on a higher or lower platform, as may be desired. To accomplish this, the floor of the stalk passage-way is broken, the rear part (indicated by J) being pivoted to the fixed front part J'. The position of this pivot can be varied from immediately behind the knife to any point along its distance that will give the receiving-platform the necessary amount of rise. To the rear end of the part J of the stalk passage-way the receiving-platform K is pivoted. The delivery end of the part J of the stalk passage-way is raised and lowered by means of the handle L, which is fastened to the cross-shaft L', to which a crank $L^2$ is keyed, which crank is brought beneath the part J. As the handle is moved back and forth the delivery end of the part J of the stalk passage-way is raised and lowered on its pivot to the front part J' of the passage-way. In the drawings a small stirrup $j$ is shown to hold the adjustable part of the stalk passage-way upon the crank. The receiving-platform K is kept in a horizontal plane by means of the elbow-lever M, which is pivoted to a fixed part of the machine, one arm of which extends beneath the platform K, and to the other arm of which a connecting-rod $m$ is attached and connected with a crank $m'$, that is keyed fast to the cross-shaft L'. The arms of the elbow-lever M are of such length as, when the handle L is worked, that the receiving-platform K shall be kept in a horizontal plane whatever be the position of the delivery end of the floor of the stalk passage-way J.

Attention is called to the fact that when the stalk passage-way and receiving-platform are lowered, as shown in dotted line in Fig. 3, the tendency with machines in which the forwarding-chains are carried throughout their length upon the same inclined plane is to vertically lift the stalks so that they will not rest on the receiving-platform, and thus any advantage of the adjustment of the platform is lost. Our construction, having the chains in different planes and using the horizontal guide-rod, holds the stalks down upon the receiving-platform, so that they will rest thereon and the object of the adjustment of the platform thus be accomplished.

It is to be understood that the receiving-platform is the receiving-platform of a binder of the Appleby type, such as shown in the Peck patent heretofore referred to. It will be plain, therefore, that when this receiving-platform is raised and lowered the stalks will be raised and lowered in the binder, and the band will therefore be placed about the bundle in different positions.

Having now described our invention, what we claim, and desire to secure by Letters Patent, is—

1. The combination, in a corn-harvester, of forwardly-projecting prongs forming a stalk passage-way, and forwarding devices carried by said prongs, one on each side of the passage, the receiving ends of said forwarding devices being located at their points in substantially the same horizontal plane, and the forwarding device on one side of the passage-way being extended rearward on a greater inclination and terminating at a greater elevation than the forwarding device on the other side of the passage-way.

2. The combination, in a corn-harvester, of forwardly-projecting prongs forming a stalk passage-way, and forwarding devices carried by said prongs, one on each side of the passage, the receiving ends of said forwarding devices being located at their point in substantially the same horizontal plane, and the forwarding device on the outer side of the passage being extended rearward on a greater inclination and terminating at a greater elevation than the forwarding device on the inner side of the passage.

3. The combination, in a corn-harvester, of forwardly-projecting prongs forming a stalk passage-way, and forwarding devices carried by said prongs on each side of said passage-way, said forwarding devices extending upwardly and rearwardly at different inclinations and having their delivery ends located in different horizontal planes, and the forwarding devices on the outer prong being extended beyond the delivery end of those on the opposite prong.

4. The combination, in a corn-harvesting machine, of forwardly-projecting prongs forming a stalk passage-way, forwarding devices mounted on these prongs and extending therealong at different inclinations, and a guide-rod mounted on the prongs and extending along the stalk passage-way, the guide-rod having an inclination from the horizontal less than that of the forwarding devices on the prongs.

5. The combination, in a corn-harvester, of forwardly-projecting prongs forming a stalk passage-way, forwarding devices carried by said prongs and provided with teeth projecting into said passage-way from each side, and an auxiliary forwarding device forming a rearward extension or continuation of the device on the outer prong, said auxiliary forwarder having teeth projecting into the passage-way from one side only, and said teeth being of greater length than those on the first-mentioned forwarders.

6. The combination, in a corn-harvester, of forwardly-projecting prongs forming a stalk passage-way, forwarding devices carried by said prongs and extending upwardly and rearwardly, a guide-rod mounted on one of the prongs and projecting into and extending rearwardly along the passage-way, with an inclination from the horizontal less than that of the forwarding devices and means for adjusting the rod to narrow or widen the passage-way.

7. The combination, in a corn-harvester, of forwardly-projecting prongs forming a stalk passage-way, a knife to sever the stalks, a stalk-receiving platform, and a stationary flooring leading from the knife rearwardly toward the platform, said platform being hinged at its receiving end to an adjustable hinged section of the flooring.

8. The combination, in a corn-harvesting machine, of forwardly-projecting prongs that guide the stalks to the knife, a knife to sever the stalks, the corn passage-way extending from the knife rearwardly, a receiving-platform to which the passage-way leads, the passage-way being pivoted to a fixed part of the machine, a shaft having a crank for adjusting the delivery end of the passage-way, an elbow-lever pivoted to the machine, one arm of which adjusts the receiving-platform and the other arm of which is connected to a crank on the shaft which adjusts the stalk passage-way.

9. The combination, in a corn-harvester, of forwardly-projecting prongs forming a stalk passage-way, a knife to sever the stalks, a stalk-receiving platform, and a stationary inclined flooring leading from the knife rearwardly and upwardly toward the platform, said platform being hinged at its receiving end to an adjustable section of the inclined flooring, and means for adjusting said floor-section vertically without disturbing its horizontal position.

10. The combination, in a corn-harvesting machine, of forwardly-projecting prongs, forwarding devices located on these prongs, the delivery end of the forwarding devices being positioned in different planes, and a guiding-rod pivoted to one of the prongs and extending rearward in the corn passage-way between the prongs, more nearly in a horizontal plane than is the forwarding device on the opposite side of the passage-way.

11. The combination, in a corn-harvesting machine, of forwardly-projecting prongs, tops-fowarding devices mounted on these prongs, a knife positioned between these prongs, a passage-way leading from the knife to the receiving-platform, butts-forwarding devices located one on each side of the passage-way near the floor of the same, which receive the stalks at the knife and forward them toward the receiving-platform, the receiving ends of the butts-forwarding devices being in the same horizontal plane, and said forwarding devices extending rearwardly at different inclinations, and terminating one in a higher horizontal plane than the other.

12. The combination, in a corn-harvesting machine, of forwardly-projecting prongs forming a stalk passage-way between them, forwarding devices on these prongs, one on each side of the passage-way, the receiving ends of said forwarding devices being located at their points in substantially the same horizontal plane, and both said forwarding devices extending rearwardly and upwardly, the forwarding device on the outer prong having a greater inclination than that on the inner prong, and an auxiliary forwarding device forming a continuation of the forwarding device on the outer prong, and extending upwardly beyond the inner forwarding device, said auxiliary device having teeth projecting into the passage-way.

JOHN W. PRIDMORE.
BERT R. BENJAMIN.

Witnesses:
GEORGE C. BLACKMER,
HENRY B. ATTLEY.